US012680758B2

(12) United States Patent
Shahverdi et al.

(10) Patent No.: US 12,680,758 B2
(45) Date of Patent: Jul. 14, 2026

(54) NON-WATER COOLED CONSUMABLE ELECTRODE VACUUM ARC FURNACE FOR CONTINUOUS PROCESS

(71) Applicant: PYROGENESIS CANADA INC., Montréal (CA)

(72) Inventors: Ali Shahverdi, Verdun (CA); Pierre Carabin, Montréal (CA); Jean-René Gagnon, Boisbriand (CA); Jonathan Mercier-Gingras, Montreal (CA)

( * ) Notice: Subject to any disclaimer, the term of this patent is extended or adjusted under 35 U.S.C. 154(b) by 994 days.

(21) Appl. No.: 17/617,223

(22) PCT Filed: Jun. 8, 2020

(86) PCT No.: PCT/CA2020/000067
§ 371 (c)(1),
(2) Date: Dec. 7, 2021

(87) PCT Pub. No.: WO2020/243812
PCT Pub. Date: Dec. 10, 2020

(65) Prior Publication Data

US 2022/0236007 A1 Jul. 28, 2022

Related U.S. Application Data

(60) Provisional application No. 62/858,883, filed on Jun. 7, 2019.

(51) Int. Cl.
*F27B 3/08* (2006.01)
*F27B 3/10* (2006.01)
(Continued)

(52) U.S. Cl.
CPC ................ *F27B 3/085* (2013.01); *F27B 3/10* (2013.01); *F27D 11/10* (2013.01); *H05B 3/04* (2013.01); *F27D 2007/066* (2013.01)

(58) Field of Classification Search
CPC ................................. H05B 7/10; F27B 3/085
(Continued)

(56) References Cited

U.S. PATENT DOCUMENTS 1,378,972 A 5/1921 Moore
4,238,634 A 12/1980 Krogsrud
(Continued)

FOREIGN PATENT DOCUMENTS

CN 105241256 A 1/2016
CN 208748138 U 4/2019
(Continued)

OTHER PUBLICATIONS

European Search Report issued by the European Patent Office (EPO) on Jun. 21, 2023 in connection with European patent application No. 20818220.4.
(Continued)

*Primary Examiner* — Vy T Nguyen
(74) *Attorney, Agent, or Firm* — BCF LLP

(57) ABSTRACT

A consumable electrode vacuum arc furnace and, more particularly, a direct current consumable electrode vacuum arc furnace is provided, wherein no water cooling is needed to cool down typically neither the electrodes, nor any other parts of the furnace, and this includes the shell, the flanges ports and the electrical connections of the furnace. The present furnace uses non-metallic electrodes, such as graphite electrode, which are suitable for melting metals, smelting of metal ores, and metal oxide to elemental metal where the use of graphite electrodes is a common practice. The present furnace and electrode assemblies render possible to perform a true continuous process of melting and smelting under controlled pressure.

20 Claims, 5 Drawing Sheets

(51) Int. Cl.
*F27D 7/06* (2006.01)
*F27D 11/10* (2006.01)
*H05B 3/04* (2006.01)

(58) Field of Classification Search
USPC ................ 219/121.17, 121.38, 50, 532, 649; 373/134, 155; 110/250, 346
See application file for complete search history.

(56) References Cited

U.S. PATENT DOCUMENTS

| | | | | |
|---|---|---|---|---|
| 4,519,835 | A * | 5/1985 | Gauvin | C22B 4/005 75/10.22 |
| 4,759,032 | A | 7/1988 | Willis | |
| 5,009,703 | A | 4/1991 | Arvidson | |
| 5,748,666 | A | 5/1998 | Andersson | |
| 5,956,366 | A | 9/1999 | Shimizu | |
| 6,971,323 | B2 * | 12/2005 | Capote | F23G 5/444 110/342 |
| 7,534,301 | B2 * | 5/2009 | White | H01J 37/32174 118/728 |
| 2010/0124247 | A1 | 5/2010 | Kaltenbach | |
| 2020/0239980 | A1 * | 7/2020 | Carabin | F27D 11/10 |

FOREIGN PATENT DOCUMENTS

| | | | |
|---|---|---|---|
| WO | 9203896 | A1 | 3/1992 |
| WO | 2019071335 | A1 | 4/2019 |

OTHER PUBLICATIONS

Substantive Examination Adverse Report issued by Intellectual Property Corporation of Malaysia on Sep. 19, 2025 in connection with Malaysia patent application No. PI2021007283.

Examiner's Report issued by the Canadian Intellectual Property Office (CIPO) on Apr. 9, 2024 in connection with Canadian patent application No. 3,140,881.

* cited by examiner

NON-WATER COOLED CONSUMABLE ELECTRODE VACUUM ARC FURNACE FOR CONTINUOUS PROCESS

CROSS REFERENCE TO RELATED APPLICATIONS

This Application claims priority on U.S. Provisional Application No. 62/858,883, now pending, filed on Jun. 7, 2019, which is herein incorporated by reference.

FIELD

The present subject matter relates to vacuum arc furnaces and, more particularly, to sealed electric vacuum arc furnaces provided with consumable moveable electrodes.

BACKGROUND

Electric arc furnaces have been used extensively in melting and smelting processes. Particularly, vacuum arc furnaces have been used for melting and re-melting applications where high quality and high purity of the metal is desired. For the applications in which a consumable electrode is desired, such as in re-melting and smelting processes, the electrodes' sealing is of great importance. In most cases, this results from the need, to control the arc voltage, for one or more electrodes to be displaced constantly or intermittently. Moreover, when the electrode is consumed during the process, it is mandatory to introduce a new electrode to maintain a continuous operation. In the case of smelting processes for metal production, such as silicon, the use of consumable graphite electrodes is a common practice. Unlike the electrodes made of metals which have a perfect surface finish and very dense bulk, those made of graphite suffer from not possessing these properties, and specifically since graphite possesses some degree of porosity which is detrimental to reaching and maintaining high degree of vacuum levels.

Another aspect of vacuum-sealed electric arc furnaces lies in properly sealing the electrode that is displaced during the process. In general, sealing a moving object is more challenging than a stationary one. It is indeed the case when electrode cooling is avoided because the seal will be exposed to higher temperatures. It is of great interest to avoid any water cooling around the furnace since these furnaces operate at very high temperatures and they contain molten metal and metal oxide. Therefore, any presence of water could cause a catastrophic failure of the furnace by steam explosion and consequently harm to the operators. Indeed, over the years, there have been many fatal accidents from electric arc furnaces, mostly due to water leakage.

In each of U.S. Pat. No. 2,971,996, which issued to Gruber et al. on Feb. 14, 1961, and U.S. Pat. No. 3,213,495, which issued to Buehl on Oct. 26, 1965, a vacuum arc furnace with a consumable electrode is described. The top electrode, which is the moving part, is sealed; however, the type of sealing is not provided, nor is the needed cooling and mechanical details of such sealing. The top electrode is connected to a supporting rod with a different geometry passed through the top furnace shell. It is evident that this design does not allow for a continuous process where the electrode consumption has to be compensated by introducing new electrode through the seal. Moreover, the crucible bottom is water cooled, which increases the chance of water leaking into the system, which can eventually cause a steam explosion.

In U.S. Pat. No. 3,246,070, which issued to Wooding on Apr. 12, 1966, a consumable vacuum arc furnace is described. The top electrode (ram) is water cooled. The bottom electrode (crucible) is also water cooled. Therefore, in the case of any water leakage into the system where molten metal is present, a steam explosion is highly probable. Also, as described therein, a continuous process is not possible due to the fact that the consumable electrode cannot be changed without stopping the process. In this vacuum arc furnace, due to the use of water cooling in the crucible, a smelting process that requires a very high energy input and temperature, for example 11-13 kWhr/kg of silicon at temperatures above 1800° C., cannot be economically and efficiently practiced.

In U.S. Pat. No. 4,027,095, which issued to Kishida et al. on May 31, 1977, a hermetically sealed arc furnace is disclosed for the production of steel. As per this arc furnace, the electrode sealing is protected from the furnace heat by means of water cooling. The movement of the electrodes is provided by a telescopic mechanism of the seal allowing for upward and downward movement. As per the description of the seal, a graphite electrode is in direct contact with the seal. Since graphite materials possess notable porosity and poor surface finish, achieving a very high vacuum level cannot be possible.

In U.S. Pat. No. 5,127,468, which issued to Poulsen on Jul. 7, 1992, reference is made to a consumable electrode vacuum arc furnace for melting metal and alloys, particularly titanium and titanium-base alloys. As described, the vacuum furnace cannot run continuously as melting is continued until the annular marginal area at least begins to melt and melting is discontinued before the marginal area melts away completely.

Therefore, it would be desirable to provide a sealed electric vacuum arc furnace that can operate without water-cooling with a consumable moveable electrode, particularly one made of graphite.

SUMMARY

It would thus be desirable to provide a novel vacuum arc furnace that is provided with a consumable moveable electrode.

The embodiments described herein provide in one aspect an electric arc furnace, comprising a (closed) vessel, at least one top electrode, at least one bottom electrode, the vessel including a top furnace spool and a bottom furnace crucible, the top electrode being adapted to carry electric current so as to maintain a plasma arc between the top electrode and the bottom electrode, at least one feeding port adapted to be displaced between an open position for charging of materials in the vessel and a closed sealed position, at least one exhaust port adapted for exhausting furnace gas from the vessel and to be sealed from an exhaust line, and at least one tap hole adapted to be displaced between an open position for removing molten material from the furnace crucible and a closed sealed position.

For instance, the top furnace spool and the bottom furnace crucible are both refractory-lined.

For instance, the top electrode is made of any suitable material, for instance of carbon material(s), such as graphite.

For instance, a top electrode assembly is provided externally of the vessel for sealing the top electrode from an outside environment For instance, a housing is provided atop the furnace spool with the top electrode extending within the housing and into the vessel.

For instance, the top electrode is sealed from the outside environment through the top electrode assembly, via at least one seal provided between lower flanges connecting a lower end of the housing to the vessel, also via at least one seal provided between upper flanges connecting an upper end of the housing to the top electrode assembly, and also possibly via at least one seal provided between intermediate flanges connecting together sections of the housing.

For instance, a sleeve is provided externally of the top electrode and internally of the housing.

For instance, the sleeve is located between the top electrode and vacuum seals in the top electrode assembly so that vacuum sealing is only carried out on the sleeve.

For instance, the sleeve is made of high duty materials that are suited for vacuum sealing, such as steel materials.

For instance, a gap is provided between the sleeve and the top electrode, whereby the sleeve is adapted to act as a thermal barrier between the top electrode and the housing where seals are located.

For instance, the gap is adapted to be maintained under vacuum, heat transfer from the top electrode and surroundings thereof being limited by forcing heat along the top electrode towards the top electrode assembly where it is cooled by natural air convection.

For instance, by having the top electrode thermally insulated by the sleeve, commercially available sealing materials can be used for seals located exteriorly of the sleeve, sealing materials such as Viton™.

For instance, a cleaning device is provided substantially at a junction of the furnace spool and the housing for substantially preventing particulates entrained in the furnace gas from entering the housing.

For instance, the cleaning device is also adapted to remove deposits from the top electrode, in each displacement of the top electrode.

For instance, the cleaning device is made of electrically insulated material, such as ceramics.

For instance, the feeding port is sealed by a seal, made, for example, of a compressible gasket or O-rings, which seal is placed on the feeding port and a cap for blocking the feeding port when charging the vessel is stopped or when a vacuum valve, such as a gate valve, is closed.

For instance, the seal of the feeding port is selected from commercially available materials, as temperatures at the feeding port are low enough.

For instance, the exhaust port is sealed by a seal, made, for example, of a compressible gasket or O-rings, which seal is placed on the exhaust port and a cap for blocking the exhaust port when desired.

For instance, the seal of the exhaust port is selected from commercially available materials, as temperatures at the exhaust port are low enough.

For instance, a non-water-cooled vessel flange is provided at a junction of the furnace spool and furnace crucible and is sealed thereat by a vessel seal.

For instance, refractory linings are provided in each of the furnace spool and furnace crucible and inwardly of the vessel seal thereby limiting the temperatures at the vessel seal, whereby the vessel seal does not require to be water-cooled.

For instance, the vessel seal is selected from commercially available sealing materials, such silicone or PTFE.

For instance, a bottom electrode assembly is provided, which includes the bottom electrode, the bottom electrode including an electrically conductive extension lead (or rod).

For instance, the bottom electrode assembly is connected to the furnace crucible by means of the extension rod.

For instance, an electrically conductive lining is provided at a bottom of the furnace crucible, the extension rod being embedded (or buried) in the conductive lining.

For instance, the electric arc is adapted to be initially formed between the top electrode and the conductive lining by passing electrical current through the extension rod and bottom electrode assembly, the bottom electrode assembly being adapted to be connected to a power supply.

For instance, the tap hole extends in the furnace crucible above the conductive lining so that the molten material contained in the furnace crucible can be periodically tapped out through the tap hole.

For instance, the tap hole is blocked during furnace operation by a cap lined with a refractory, the cap being sealed by a seal to maintain a vacuum or pressure throughout the furnace operation and to avoid escape of process gases and/or molten materials during the furnace operation.

For instance, the top electrode assembly includes a removable electrical connector for connecting the top electrode to a power supply and for allowing a new top electrode to be added for compensating for consumption of a used electrode, when the top electrode is made of consumable electrode material, thereby enabling a continuous or semi-continuous process For instance, the removable electrical connector is adapted to connect the top electrode to the power supply via a proper electrical extension, such as copper bus bars.

For instance, the removable electrical connector is electrically isolated from the vessel by means of at least two high temperature electrical insulators, such as machinable material like PEEK or glass-silicon laminate.

For instance, one of the electrical insulators and the removable electrical connector are sealed by at least upper and lower sealing components, such as O-rings, the lower sealing component being adapted to sit on a flange attached to the sleeve.

For instance, the sleeve is sealed by means of at least one sealing component, such as a Lip seal or spring-loaded seals, for withstanding a displacement of the top electrode and a high temperature of the sleeve.

For instance, a guide is provided for ensuring that the removable electrical connector, the top electrode and the sleeve are aligned and sealing components are well positioned and maintained during the operation of the furnace, the guide extending between the sleeve and the housing of the top electrode assembly, and the guide being made for instance of non-abrasive/self-lubricating materials.

For instance, an anode housing of the bottom electrode assembly is connected to the furnace crucible by means of a flexible bellows tube adapted to allow the bottom anode assembly to move slightly without affecting the vacuum sealings.

For instance, due to a high temperature gradient in the furnace crucible and along the bottom anode assembly, notable expansion/contraction of at least the extension lead, which experiences a temperature gradient for example from more than 1800° C. to less than 300° C. in the bottom anode assembly, is adapted to be accommodated by the bellows tube.

For instance, as the temperature of the furnace crucible increases, the extension lead linearly expands along an axis thereof, thereby pushing the bottom anode assembly downwardly, with a resulting downward displacement being compensated by the bellows tube for maintaining a desired vacuum level in the vessel.

For instance, the bottom electrode includes an electrical connector that is attached to a lower end of the extension lead.

For instance, the electrical connector is attached to an upper conductive plate for allowing a good portion of heat transferred from the furnace crucible through the extension lead to be dissipated in the bottom electrode assembly exteriorly of the furnace crucible, thereby maintaining an operating temperature of the furnace for keeping sealing components below maximum service temperatures thereof.

For instance, both the electrical connector and the upper conductive plate are made of highly electrically and thermally conductive materials, such as copper.

For instance, the bottom electrode assembly includes a cooling device adapted to having a cooling medium, such as air, to be blown thereon.

For instance, the cooling device includes finned tubes, for instance made of copper, which are stacked in a housing for effective heat transfer from the bottom electrode assembly to the cooling air.

For instance, the housing is adapted to confine the finned tubes and to direct a gas coolant, such as air, over fins of the finned tubes.

For instance, the finned tubes are positioned between the upper conductive plate and a lower conductive plate, with hanger rods connecting the upper and lower conductive plates.

For instance, the hanger rods are electrically insulated from the lower conductive plate by means of grommets for maintaining the housing electrically insulated from the bottom anode assembly.

For instance, the hanger rods not only keep the finned tubes in place, but are also adapted to compress the upper conductive plate towards vacuum seals for effective tightness and sealing, the vacuum seals 43, such as O-rings, being placed over an insulation ring adapted to act as an electrical disconnector between the bottom anode assembly and a furnace shell.

For instance, the housing is connected to a lower end of the bellows tube.

For instance, the bottom anode assembly is attached to the furnace crucible via a transition flange mounted to a furnace crucible shell, the bottom electrode including an extended electrically conductive lead attached to the lower conductive plate, the bottom anode assembly being connected to a power supply by means of the electrically conductive lead.

For instance, the top electrode and the sleeve are adapted for moving up and down together.

For instance, the top electrode and the sleeve are connected together at upper ends thereof via at least one intermediate component.

For instance, the top electrode and the sleeve are connected together at upper ends thereof via at least the removable electrical connector, whereby the top electrode and the sleeve are adapted for moving up and down together.

For instance, the furnace is used for the production of produce high purity silicon (+99.9% purity Si) from its raw material (quartz, quartzite) by carbothermic reduction reaction.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which.

DESCRIPTION OF VARIOUS EMBODIMENTS

The present subject matter relates to a consumable electrode vacuum arc furnace and, more particularly, to a direct current consumable electrode vacuum arc furnace, wherein no water cooling is needed to cool down typically neither the electrodes, nor any other parts of the furnace, including but not limited to the shell, the flanges ports and the electrical connections of the furnace. Specifically, the present subject matter relates to a non-metallic electrode, such as graphite electrode arc furnaces suitable for melting of metals, smelting of metal ores, and metal oxide to elemental metal where the use of graphite electrodes is a common practice. The present subject matter renders possible to perform a true continuous process of melting and smelting under controlled pressure, which is a key factor for the latter process.

Figure 1:
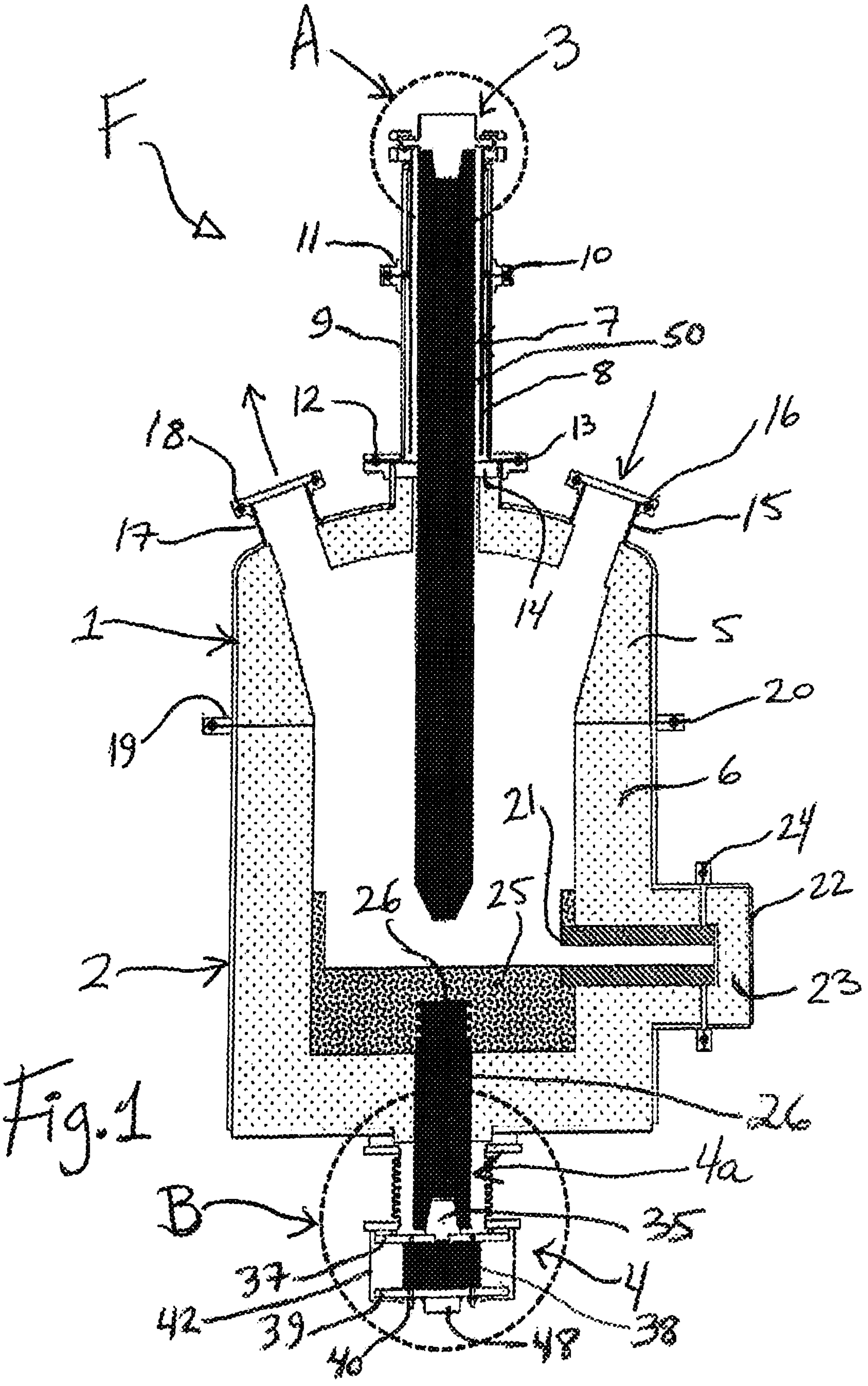
FIG. 1 is a schematic vertical cross-sectional view of a consumable vacuum arc furnace in accordance with an exemplary embodiment.

Now referring to FIG. 1, an embodiment is shown of a vacuum electric arc furnace F, which comprises one consumable electrode and a refractory-lined closed vessel designed to operate at high temperatures and suitable for melting and smelting processes. The furnace F is comprised of four main subsections: a top furnace spool 1, a furnace crucible 2, a furnace top electrode(s) assembly 3, and a furnace bottom electrode(s) assembly 4. The spool 1 is lined with a refractory material(s) 5, for protection from hot and/or reactive evolving gas and for maintaining heat within the vessel. The spool 1 is designed to act as a closing cap on top of the furnace crucible 2, and to keep the whole furnace enclosed.

The furnace crucible 2 is also lined with a refractory materials(s) 6, to maintain the necessary heat for the process and to protect the furnace shell. Top electrode(s) 7 carries the electric current supplied by power supply(s), not shown, to the process by maintaining a plasma arc between the top electrode 7 and a bottom electrode **4*a* of the bottom electrode assembly 4, through an extension lead, or rod, 26. The top electrode 7 can be made of any suitable material for the specific process, which is known to experts in the field. More particularly, it can be made of carbon material(s), such as pre-baked graphite for smelting processes, such as silicon production from quartz where carbon is one of the reductants. The use of graphite electrodes is also common in metal melting processes. The bottom electrode 4*a* includes the extension lead 26, a connector 35 and an extended electrically conductive lead 48**.

The top electrode 7, is sealed from the outside environment through the top electrode assembly 3, by a seal 10 located between a pair of middle top flanges 11, and by a seal 12 located between a pair of bottom top flanges 13. The top electrode 7 is separated from an elongated housing 9 by means of a sleeve 8. The sleeve 8 plays an important role in the top electrode 7 functionality. Firstly, the sleeve 8 is located between the top electrode 7 and the vacuum seals in the top electrode assembly 3 so that the vacuum sealing is only done on the sleeve 8 which can be made of high duty materials proper for vacuum sealing, such as steel materials that can be easily machined down to a very precise tolerance and accepted surface finish for high vacuum sealing purposes. Secondly, the sleeve 8 acts as a thermal barrier between the top electrode 7 and the elongated housing section 9 where the seals are located. This is achieved by a gap 50 provided between the sleeve 8 and the top electrode 7, which can be kept under vacuum. This design helps to minimize heat transfer from the top electrode 7 and its surroundings by forcing the heat flows along the top electrode 7 towards the top electrode assembly 3 where it is cooled by natural air convection. Having the top electrode 7 thermally insulated by the sleeve 8 allows for the use of commercially available sealing materials for seals 10 and 12, such as Viton™, and for seal 31 of the top electrode assembly 3 (see FIG. 2). Thirdly, the top electrode 7 and the sleeve 8 are connected at upper ends thereof, via other components described hereinafter, and the sleeve 8 is connected to a driving device (not shown), such that the top electrode 7 and the sleeve 8 are adapted to move up and down together.

High temperature processing of materials, and particularly in smelting processes, where the electric arc is used, generates dusts made of very fine particulates. These particulates entrained in the furnace gas, can enter the sleeve 8, and get deposited on the seals 10, 12 and 31. This can result in a reduced vacuum sealing efficiency of the seals in the top electrode assembly 3 in continuous process. Therefore, a cleaning device 14 made of electrically insulated material, such as ceramics, is provided to block the particulates from entering the sleeve 8 and remove deposits from the top electrode 7, in each displacement of the sleeve 8.

For continuous or semi-continuous processes, charging of materials is possible through a feeding port(s) 15, which is sealed by a seal 16. The seal 16 can be, for example, made of a compressible gasket or O-rings, which is placed on the port 15 and a cap, not shown, for blocking the port 15 when feeding is stopped or when a vacuum valve (not shown), such as a gate valve, is closed. The furnace gas is exhausted through an exhaust port 17, which is sealed from the exhaust line (not shown) by a seal 18. Both seals 16 and 18 can be selected from commercially available materials since the expected temperature at these locations are well below the standard limit.

The spool 1 and the crucible 2 are connected by a non-water-cooled flange 19, which is sealed by a seal 20. The refractory linings 5 and 6 make it possible to maintain the flange temperature well below 220° C. for process temperatures above 1800° C. At this flange temperature of below 220° C., commercially available sealing materials, such as silicone or PTFE, can be used without the need for water-cooling.

The molten material that is contained in the bottom of crucible 2 in a conductive lining 25 can be periodically tapped out through a tap hole(s) 21, which is blocked during the operation by a cap 22 lined with a refractory 23. The cap 22 is sealed by a seal 24 to maintain the vacuum or pressure throughout the process and to avoid escape of process gases and/or molten materials during the furnace operation. The bottom electrode assembly 4 is connected to the furnace crucible 2 by means of the electrically conductive extension rod 26, which is embedded or buried in the electrically conductive lining 25. The electric arc is initially formed between the top electrode 7 and the conductive lining 25 by passing electrical current through the electrically conductive extension rod 26 and bottom electrode assembly 4, which is connected to the power supply (not shown).

Figure 2:
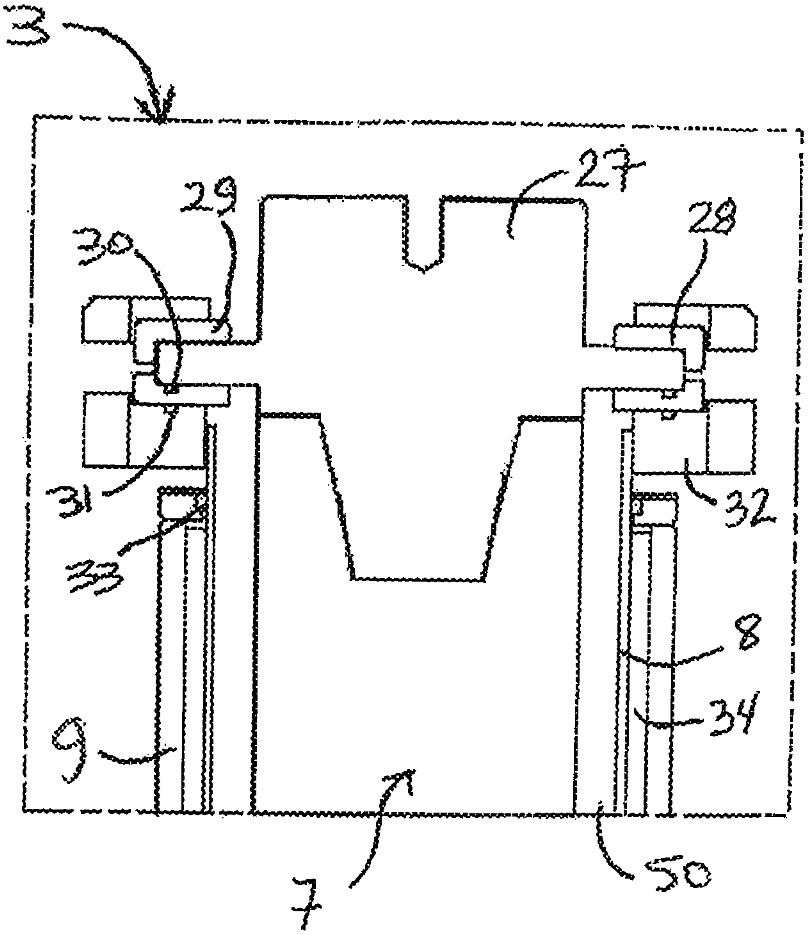
FIG. 2 is an enlarged schematic cross-sectional view of a top electrode assembly of the consumable vacuum arc furnace of FIG. 1, taken from the dotted circle A of FIG. 1, in accordance with an exemplary embodiment.

With reference to FIG. 2, an embodiment is shown wherein the top electrode assembly 3 of FIG. 1 includes a removable electrical connector 27 to connect the top electrode 7 to the power supply via a proper electrical extension, such as copper bus bars. The connector 27 is electrically isolated from the furnace body by means of two high temperature electrical insulators 28 and 29, such as that of machinable material like PEEK or glass-silicon laminate. The electrical insulator 29 and the removable connector 27 are sealed by at least two sealing components 30 (upper sealing component) and 31 (lower sealing component), such as O-rings. The removability feature of the connector 27 allows for adding a new electrode to compensate for consumption of an old electrode, in case of consumable electrode material, thereby enabling a continuous or semi-continuous process. The lower sealing component 31 is sitting on a welded flange 32 attached to the sleeve 8. The sleeve 8 is also sealed by means of at least one sealing component 33 to withstand the top electrode 7 displacement and the high temperature of the sleeve 8. The choice of this sealing component 33 is dependent on the level of vacuum to be reached and the leak rate, whereby various sealing components known to experts in the field, such as Lip seal or spring-loaded seals, can be used. In order to ensure that the connector 27, the top electrode 7 and the sleeve 8 are always aligned and sealing components are well placed and maintained during the operation of the furnace F, a guide 34, which is made of non-abrasive/self-lubricating materials, is installed between the sleeve 8 and the housing 9 of the top electrode assembly 3. From FIG. 2, it can be seen that the top electrode 7 is connected to the sleeve 8 by means of the connector 27, the electrical insulators 28 and 29 and the welded flange 32.

Figure 3:
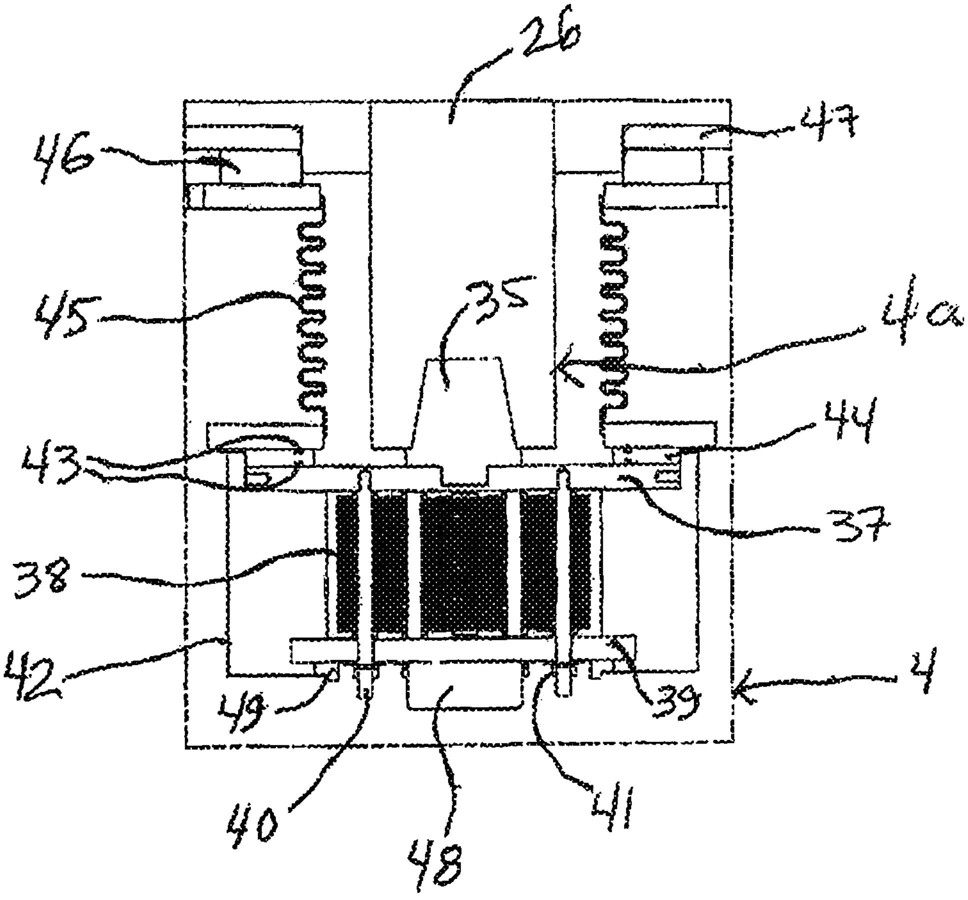
FIG. 3 is an enlarged schematic cross-sectional view of a bottom electrode assembly of the consumable vacuum arc furnace of FIG. 1, taken from the dotted circle B of FIG. 1, in accordance with an exemplary embodiment.

Now referring to FIG. 3, an embodiment is shown wherein the bottom electrode assembly 4, as shown in FIG. 1, includes the bottom electrode **4*a* with the electrical connector 35 thereof being attached to the electrically conductive extension lead 26 exteriorly of the furnace crucible 2. The electrical connector 35 is attached to a conductive plate 37, both to be made of highly electrically and thermally conductive materials, such as copper. This is because a good portion of the heat transferred from the furnace crucible 2 through the conductive extension lead 26 is dissipated in the bottom electrode assembly 4 and must be thermally managed to maintain the operating temperature of the furnace and to keep the sealing components below their maximum service temperatures. Therefore, the use of high thermally and electrically conductive materials allows for the effective gas cooling, such as air cooling, with minimal heat generation by the electrical current when high intensity is applied such that for smelting process. The air cooling is possible by blowing air over finned copper tubes 38, which are stacked in a pre-defined pattern in a housing 42, as compact as possible, to maximize the heat transfer rate from the bottom electrode assembly 4 to the cooling air and minimize space requirements. The purpose of the housing 42 is to confine the finned tubes 38 and to direct a gas coolant, such as air, over the fins on the tubes 38. The finned-tube housing 42 is electrically isolated by an insulator spacer 49. The finned tubes 38 are placed between upper and lower plates 37 and 39 with hanger rods 40. The hanger rods 40 are electrically insulated from the plate 39 by use of grommets 41. This is to keep the finned-tube housing 42 electrically insulated from the bottom anode assembly 4. The hanger rods 40 not only keep the finned tubes 38 in place, but also compress the plate 37 towards vacuum seals 43 for maximum tightness and sealing. The vacuum seals 43, such as O-rings, are placed over an insulation ring 44, which acts as an electrical disconnector between the bottom anode assembly 4** and the furnace shell.

The anode housing 42 is connected to the furnace crucible 2 by means of a flexible bellows tube 45. The bellows tube 45 allows the whole bottom anode assembly 4 to move and breathe slightly without affecting the vacuum sealings. Due to the high temperature gradient in the furnace crucible 2 and along the bottom anode assembly 4, a notable expansion/contraction of material exposed to high temperature gradient is expected. The main expansion is expected for the extension lead 26, which experiences a huge temperature gradient from more than 1800° C. to less than 300° C. in the bottom anode assembly 4. Therefore, as the temperature of the furnace crucible 2 increases, the conductive extension lead 26 linearly expands along its axis, pushing the bottom anode assembly 4 downward. This downward force is then compensated by the bellows tube 45 to keep the desired vacuum level in the furnace F. The bottom anode assembly 4 is attached to the furnace crucible 2 through a transition flange 46, which is welded to a furnace crucible shell 47. The bottom anode assembly 4 is connected to the power supply (not shown) through the conductive lead 48, which is attached to the lower plate 39.

Example 1

Figure 4:
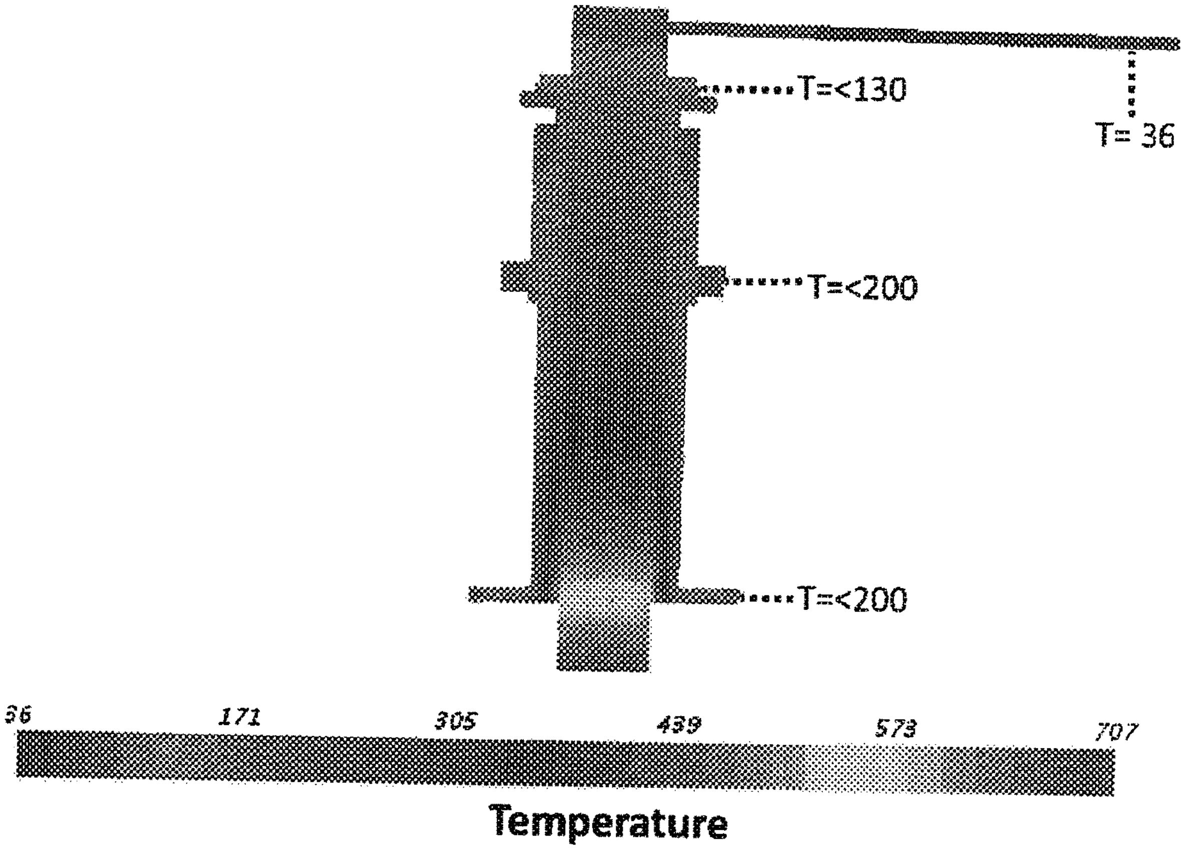
FIG. 4 is an exemplary schematic representation of a temperature profile of the top electrode assembly of FIG. 2 at an operating temperature of 1800° C., in accordance with an exemplary embodiment.

In one example, the temperature profile of the top electrode assembly 3 in 2-dimensions was simulated for a smelting process (reaction temperature over 1800° C. in the furnace). No internal cooling was considered. Only external air cooling by natural convection on the top electrode assembly 3 was considered. The result of this thermal modeling is presented in FIG. 4. The temperature varies between 700° C. at the lowest point (electrode) to 80° C. at the highest point (cap). The temperatures at the seals are low enough (<200° C.) to use commercially available products with no internal cooling required. The temperature of the extended copper part that connects to electrical wires or bus bar, is well below 75° C., which is necessary for these types of connections. Therefore, the simulation results indicate that the top electrode assembly 3 does not need any additional type of cooling and especially water cooling.

Example 2

Figure 5:
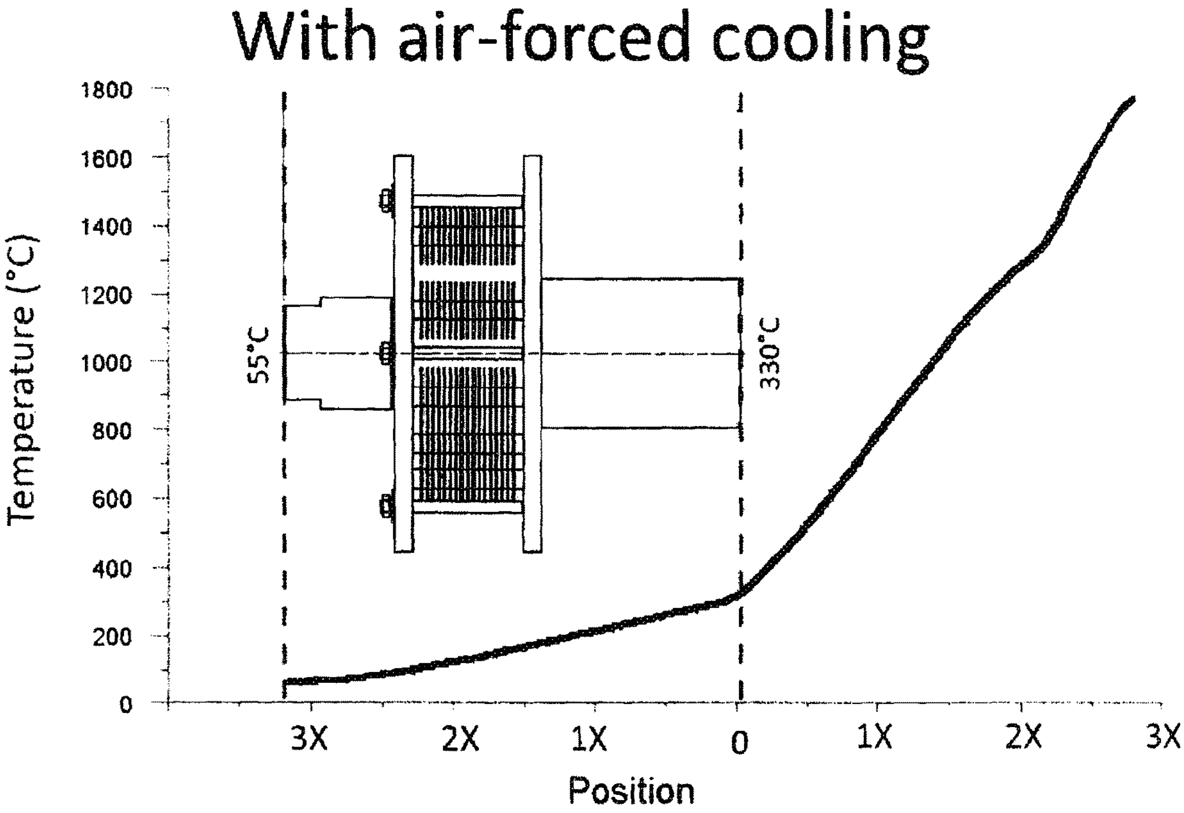
FIG. 5 is an exemplary graph of a temperature profile of the bottom electrode assembly of FIG. 3 at an operating temperature of 1800° C., in accordance with an exemplary embodiment.

In another example, the temperature profile in 1D of the bottom anode assembly 4 was calculated using forced air for cooling. The hot face temperature of the furnace bottom was considered at 1800° C., which is within the range of a smelting process. The one directional temperature profile of the bottom electrode was simulated, and the result of the temperature profile is depicted in FIG. 5. It will be apparent that the temperature drop along the axis of the bottom anode 4*a* is considerable, thereby resulting in a temperature of below 200° C. at the vacuum sealing points. This indicates a safe temperature for use of commercially available sealing materials, such as Viton O-rings.

Therefore, there is thus herein provided:

a non-water-cooled closed electric arc furnace a non-water-cooled vacuum electric arc furnace a non-water-cooled consumable electrode vacuum electric arc furnace a non-water-cooled consumable electrode vacuum eclectic arc furnace for smelting process at high temperatures a closed non-water-cooled electric arc furnace suitable for smelting processes of ore and metal oxide to elemental metals a closed non-water-cooled electric arc furnace suitable for smelting processes of ore and metal oxide to elemental metals with continuous feeding of smelting material There is also herein provided a new electrode sealing adapted to allow reaching very high vacuum levels in the electric arc furnace without a need for water cooling.

There is further herein provided a closed electric arc furnace equipped with an air-cooled bottom anode system.

There is still further herein provided a vacuum electric arc furnace with consumable graphite electrode.

There is still further herein provided a sealed continuously fed vacuum furnace.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

The invention claimed is:

1. An electric arc furnace, comprising:

a closed vessel, the vessel having a top furnace spool and a bottom furnace crucible;

a top electrode;

a bottom electrode, the top electrode being adapted to carry electric current so as to maintain a plasma arc between the top electrode and the bottom electrode;

at least one feeding port operable to be displaced between an open position for charging of materials in the vessel and a closed sealed position;

at least one exhaust port operative to exhaust furnace gas from the vessel and to be sealed from an exhaust line;

at least one tap hole operative to be displaced between an open position for removing molten material from the bottom furnace crucible and a closed sealed position;

a top electrode assembly external to the vessel, the top electrode assembly being operative to seal the top electrode from an outside environment; and a bottom electrode assembly having:

the bottom electrode, the bottom electrode having an electrically conductive extension lead or rod; and a cooling device adapted to having a cooling medium comprising air to be blown thereon, the cooling device having finned tubes stacked in a housing for transferring heat from the bottom electrode assembly to the cooling medium, the finned tubes being positioned between an upper conductive plate and a lower conductive plate, the upper conductive plate and the lower conductive plate being interconnected by hanger rods, the hanger rods being electrically insulated from the lower conductive plate by grommets for maintaining the housing electrically insulated from the bottom anode assembly.

2. The electric arc furnace of claim 1, comprising a housing atop the furnace spool with the top electrode extending within the housing and into the vessel.

3. The electric arc furnace of claim 2, wherein the top electrode is sealed from the outside environment through the top electrode assembly, comprising seals between lower flanges connecting a lower end of the housing to the vessel and between upper flanges connecting an upper end of the housing to the top electrode assembly.

4. The electric arc furnace of claim 3, comprising a sleeve externally of the top electrode and internally of the housing, wherein the top electrode and the sleeve are operative to move up and down together.

5. The electric arc furnace of claim 4, wherein the sleeve is located between the top electrode and vacuum seals in the top electrode assembly so that vacuum sealing is only carried out on the sleeve.

6. The electric arc furnace of claim 4, wherein the sleeve and the top electrode define a gap there in between, the sleeve acting as a thermal barrier between the top electrode and the housing where seals are located.

7. The electric arc furnace of claim 4, comprising a cleaning device made of an electrically insulated material, the cleaning device being located substantially at a junction of the furnace spool and the housing for substantially preventing particulates entrained in the furnace gas from entering the housing.

8. The electric arc furnace of claim 7, wherein the cleaning device is also operative to remove deposits from the top electrode, in each displacement of the sleeve.

9. The electric arc furnace of claim 1, comprising a non-water-cooled vessel flange at a junction of the furnace spool and the bottom furnace crucible, the non-water-cooled vessel flange being sealed thereat by a vessel seal, each one of the furnace spool and furnace crucible having refractory linings inwardly of the vessel seal thereby limiting the temperatures at the vessel seal.

10. The electric arc furnace of claim 1, wherein the bottom electrode assembly is connected to the bottom furnace crucible by the electrically conductive extension lead or rod.

11. The electric arc furnace of claim 1, comprising an electrically conductive lining at a bottom of the bottom furnace crucible, the electrically conductive extension lead or rod being embedded or buried in the conductive lining.

12. The electric arc furnace of claim 11, wherein, the plasma arc is to initially formed between the top electrode and the conductive lining by passing the electrical current through the electrically conductive extension lead or rod and the bottom electrode assembly, the bottom electrode assembly being connectable to a power supply.

13. The electric arc furnace of claim 11, wherein the tap hole extends in the bottom furnace crucible above the conductive lining so that the molten material contained in the bottom furnace crucible can be periodically tapped out through the tap hole.

14. The electric arc furnace of claim 4, wherein the top electrode assembly includes a removable electrical connector for connecting the top electrode to a power supply and for allowing a new top electrode to be added for compensating for consumption of a used electrode, when the top electrode is made of consumable electrode material, thereby enabling a continuous or semi-continuous process.

15. The electric arc furnace of claim 14, comprising a guide for ensuring that the removable electrical connector, the top electrode and the sleeve are aligned and sealing components are well positioned and maintained during an operation of the electric arc furnace, the guide extending between the sleeve and the housing of the top electrode assembly.

16. The electric arc furnace of claim 5, an anode housing of the bottom electrode assembly connected to the bottom furnace crucible by a flexible bellows tube operative to allow the bottom anode assembly to move slightly without affecting the vacuum seals, wherein, as the temperature of the bottom furnace crucible increases, the electrically conductive extension lead or rod linearly expands along an axis thereof, thereby pushing the bottom anode assembly downwardly, with a resulting downward displacement being compensated by the bellows tube for maintaining a desired vacuum level in the vessel.

17. The electric furnace of claim 1, wherein the bottom electrode comprises an electrical connector attached to a lower end of the electrically conductive extension lead or rod, wherein the electrical connector is attached to the upper conductive plate for allowing a portion of heat transferred from the bottom furnace crucible through the electrically conductive extension lead or rod to be dissipated in the bottom electrode assembly exteriorly of the bottom furnace crucible, thereby maintaining an operating temperature of the electric arc furnace for keeping sealing components below maximum service temperatures thereof.

18. The electric arc furnace of claim 1, wherein the hanger rods are operative to keep the finned tubes in place and to compress the upper conductive plate towards the vacuum seals for tightness and sealing, the vacuum seals being placed over an insulation ring operative to act as an electrical disconnector between the bottom anode assembly and a furnace shell, wherein the housing being connected to a lower end of the bellows tube.

19. The electric arc furnace of claim 1, wherein the bottom anode assembly is attached to the bottom furnace crucible via a transition flange mounted to a furnace crucible shell, the bottom electrode including an extended electrically conductive lead attached to the lower conductive plate, the bottom anode assembly being connected to a power supply by the electrically conductive extension lead or rod.

20. The electric arc furnace of claim 14, wherein the top electrode and the sleeve are connected together at upper ends thereof via at least the removable electrical connector, whereby the top electrode and the sleeve are operative to move up and down together.

* * * * *